United States Patent [19]
Feng

[11] Patent Number: 5,622,503
[45] Date of Patent: Apr. 22, 1997

[54] ARRANGEMENT AND METHOD OF SIMULATING VERTIGO TO TRAIN PILOT OVERCOMING VERTIGO

[76] Inventor: Genquan Feng, P.O. Box 1796, New York, N.Y. 10185-0016

[21] Appl. No.: 82,936

[22] Filed: Jun. 28, 1993

Related U.S. Application Data

[63] Continuation-in-part of Ser. No. 851,532, Mar. 16, 1992, abandoned, which is a continuation-in-part of Ser. No. 552,003, Jul. 13, 1990, abandoned.

[51] Int. Cl.⁶ .................................................. B09B 9/36
[52] U.S. Cl. ............................... 434/36; 434/35; 434/38; 434/59; 434/41
[58] Field of Search .................................. 434/29, 33–45, 434/51, 55, 53, 58, 59, 365; 364/578; 472/3, 17, 47

[56] References Cited

U.S. PATENT DOCUMENTS

| | | | |
|---|---|---|---|
| 3,732,630 | 5/1973 | Crosbie et al. | 434/40 |
| 3,983,640 | 10/1976 | Cardullo et al. | 434/59 |
| 4,527,980 | 7/1985 | Miller | 434/55 |
| 4,599,645 | 7/1986 | Brown et al. | 434/38 X |
| 4,710,128 | 12/1987 | Wachsmuth et al. | 434/59 X |
| 5,051,094 | 9/1991 | Richter et al. | 434/59 X |

*Primary Examiner*—Joe Cheng

[57] ABSTRACT

An enclosure having a horizon line, a scene, and lights is moved relative to a pilot to simulate vertigo during on-ground training of the pilot to overcome in-flight vertigo. Gravitational vertigo is simulated by a seat cushion inflatable to change the seated orientation of the pilot.

20 Claims, 4 Drawing Sheets

ARRANGEMENT AND METHOD OF SIMULATING VERTIGO TO TRAIN PILOT OVERCOMING VERTIGO

CROSS-REFERENCE TO RELATED APPLICATION

This application is a continuation-in-part of U.S. patent application Ser. No. 07/851,532, filed Mar. 16, 1992, now abandoned, which is a continuation-in-part of U.S. patent application Ser. No. 07/552,003, filed Jul. 13, 1990, now abandoned.

BACKGROUND OF THE INVENTION

1. Field of the Invention

This invention generally relates to an arrangement for and a method of simulating vertigo in on-ground training of pilots to overcome in-flight vertigo.

2. Description of Related Art

Many pilots experience vertigo, i.e. the illusion of a false position in flight in the mind of the pilot. Since vertigo can lead to a flight emergency, the art has proposed screening pilots to test their likelihood of experiencing vertigo. Drugs to alleviate airsickness are also employed as temporary cures. Educating pilots in the nature and mechanism of vertigo is also useful, but, since experience is often the best teacher, training by actually simulating vertigo on the ground is the most effective technique.

Vertigo can be simulated on the ground by electronic, chemical and thermal techniques. However, such invasive techniques are objectionable. In addition, it is known to strap a pilot in a rotary centrifuge where the pilot is rotated at high acceleration and speeds. However, this does not realistically simulate in-flight conditions. Some training simulators employ screens on which in-flight moving scenes are displayed, but experience has shown that this has not proven to be altogether satisfactory.

Vertigo also can be simulated on the ground by an opaque enclosure and an artificial environment, such as said by Crosbie et al (U.S. Pat. No. 3,732,630), Wachsmuth et al (U.S. Pat. No. 4,710,128), etc., but all of these inventions can not creating vertigo very well. The main reason is as follows:

(1) The shape of the enclosure was not defined on a best design. The past inventions always used spheric or hemisheric enclosure, or the shape of the enclosure was not exactly defined. Different shape of the enclosure well cause different effect of creating vertigo. Therefore, in my invention, it is defined that the enclosure must be spuare (or cubic), because the square (or cubic) enclosure has a best efficacy for creating vertigo.

(2) In the past inventions, the organization and design of the artificial environment always not good for creating vertigo, therefore they can not get a good efficacy for creating vertigo, even some of these invention needed a very expensive cost for built the apparatus, such as the two U.S. patents induced by us above. Therefore, in my invention, I make a good organization of the conditions, including the lighting, inflating of seat cushion, half-opaque-half-light-transmising canopy, etc. In my artificial environment, I well defined each of these conditions into a best situation and defined a best time arrangement. Therefore, even I used many conditions and apparatus which have been used by other inventors, but on the cause of I make a good organization and good defining of their parameters (situations), the efficacy of creating vertigo of my invention is much better than other inventions and patents.

For got these key points, I spent at least 7 years on a series of tremendous studies.

SUMMARY OF THE INVENTION

1. Objects of the Invention

It is a general object of this invention to effectively induce vertigo during on-ground training of a pilot to overcome in-flight vertigo.

It is another object of this invention to avoid using invasive techniques to induce vertigo.

Another object of this invention is to induce vertigo in a pilot so that the pilot will better withstand vertigo during flight.

2. Features of the Invention

In keeping with these objects, and others which will become apparent hereinafter, one feature of this invention resides, briefly stated, in an arrangement for and a method of simulating vertigo in on-ground training of pilots to overcome in-flight vertigo.

The invention comprises an opaque enclosure surrounding a pilot. The enclosure includes front and rear wall portions spaced apart of each other along a first axis, a pair of side wall portions spaced apart of each other along a second axis generally perpendicular to the first axis, a top wall portion above the wall portions, along a third axis generally perpendicular to both the first and second axes. The enclosure preferably has an open bottom, or has a bottom wall portion spaced along the third axis below the top wall portion and formed with a cutout.

A horizon line extends across the front, and preferably along the rear and side, wall portions within the enclosure. Moving means are provided for effecting relative movement between the horizon line of the enclosure and the pilot relative to at least one of the axes to impart a false illusion of position to the pilot. The moving means may move the enclosure along or about the first axis, the second axis, or the third axis.

In addition to the horizon line, an artificial environment scene may be provided on the front, rear and side wall portions. The scene may include a cloud formation, a ground scene, targets, etc.

In addition, lighting means for emitting light may be provided on the wall portions of the enclosure. The lighting means may include a single light to simulate the sun or the moon, or a series of scattered lights to simulate the stars or other light sources, or a linear row of lights to simulate runway lights, etc.

A cover may be provided to partially overlie a canopy above the pilot seated in an airplane trainer within the enclosure. The cover is opaque and the canopy is light-transmissive. By covering about half the canopy, vertigo may be reliably induced.

The pilot may, in a preferred embodiment, be seated on an inflatable cushion having multiple compartments into which pressurized gas is selectively admitted to tilt or roll the seated pilot through angular arcs of at least 30° to simulate gravitational vertigo.

The arrangement (enclosure) is controlled by its controller according to a procedure which is randomly prepared by the controller and changed by him for each training. The procedure is listed and scheduled in a series of programs, each program includes one action, or several actions done simultaneously, (the action means moving the enclosure in one or several axes, lighting, covering about half the canopy, and inflating the seat cushion, one at a time or combined). Each action stands for about 5–30 seconds then recovers to its original position, for instance, in an action of "10 seconds lighting", the recovering is "turn-off the light". The interval between two actions (including its recovering) is usually 20–60 seconds randomly. In one training, usually includes 5–15 programs, each program includes one action, or several actions done simultaneously.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
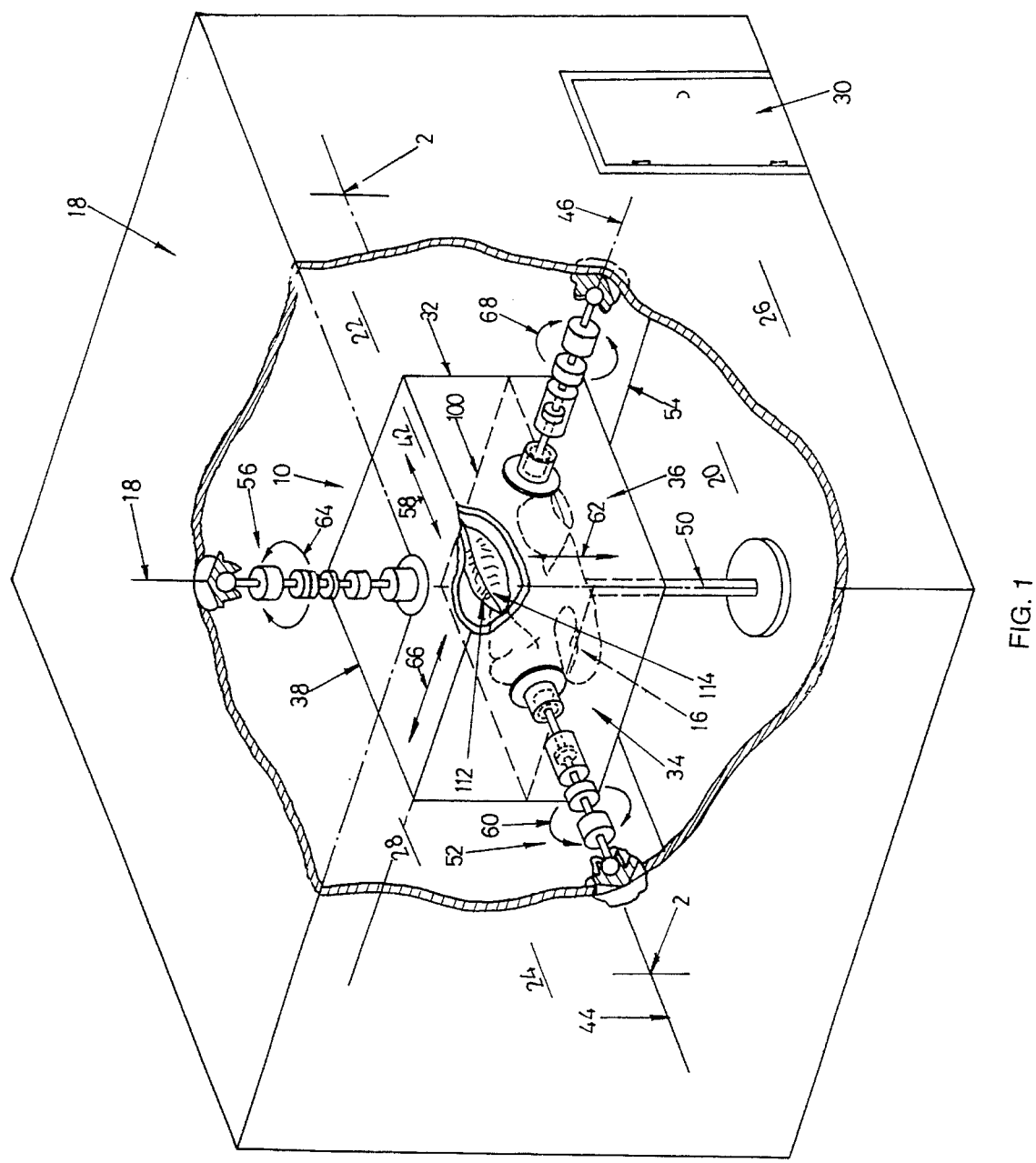
FIG. 1 is a partially broken away, perspective view of a vertigo-simulating arrangement according to this invention.
Figure 2:
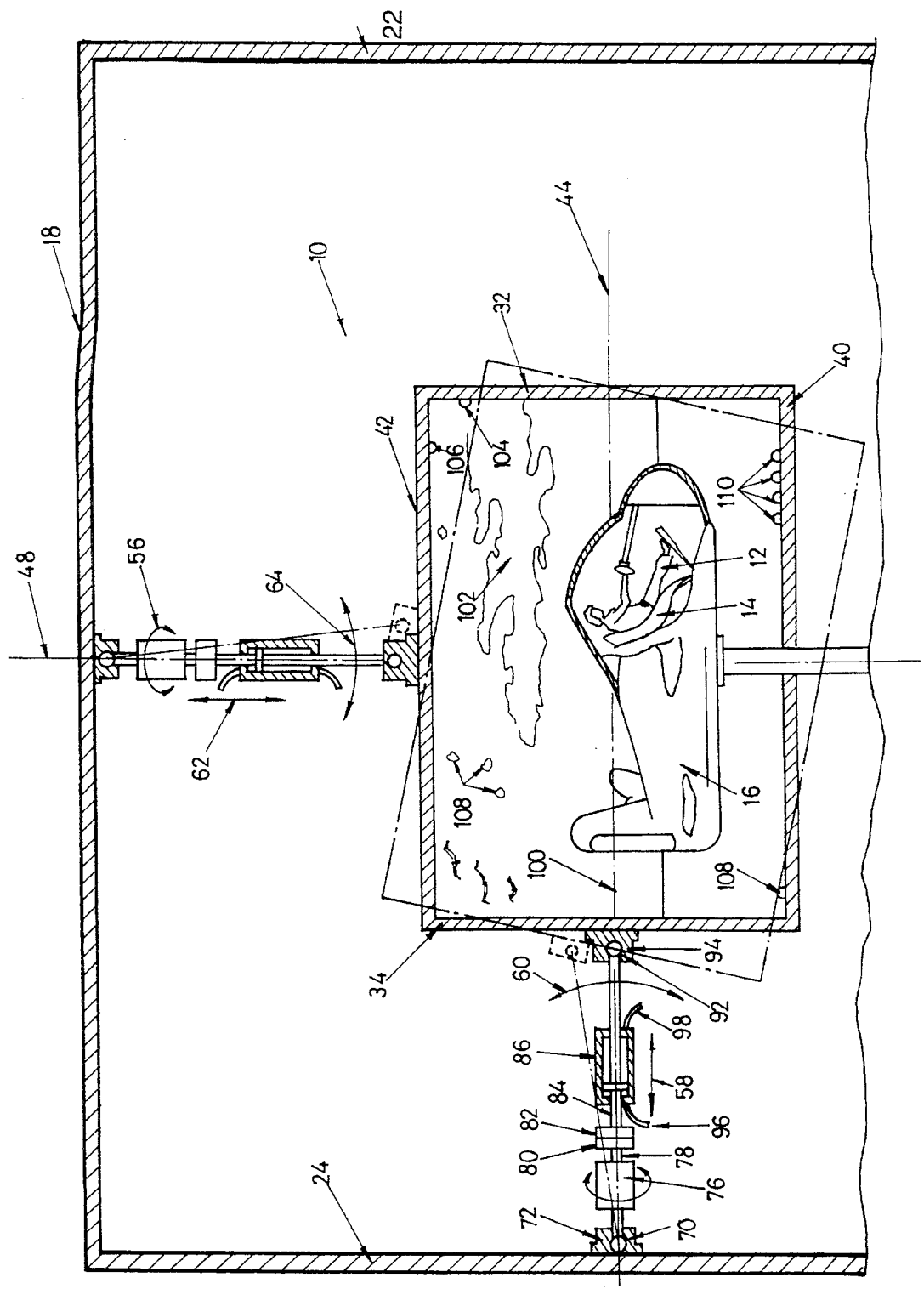
FIG. 2 is a sectional view taken on line 2—2 of FIG. 1.

Referring now to the drawings, reference numeral 10 generally identifies an opaque enclosure or box surrounding a pilot 12 shown sitting in a seat 14 in an airplane trainer 16. Box 10 and trainer 16 are situated in a room having a ceiling 18, a floor 20, a front wall 22, a rear wall 24, and a pair of side walls 26, 28. A door 30 enables access to the room.

The box 10 includes a front wall portion 32 spaced from front wall 22, a rear wall portion 34 spaced from rear wall 24, side wall portions 36, 38 spaced from side walls 26, 28, a bottom wall portion 40 spaced from floor 20, and a top wall portion 42 spaced from ceiling 18. The front and rear wall portions 32, 34 are spaced apart along a first axis 44. The side wall portions 36, 38 are spaced apart along a second axis 46. The bottom and top wall portions 40, 42 are spaced apart along a third axis 48.

The trainer 16 is supportably positioned within the box 10 by an upright support 50. The lower end of support 50 is stationarily mounted on the floor 20. The upper end of the support 50 is stationarily connected to the trainer 16. The bottom wall portion 40 of the box 10 has a central cutout or may be completely open to enable the support 50 to extend up into the box.

A drive arrangement movably positions the box relative to the trainer 16 along and/or about said axes 44, 46, 48. The drive arrangement includes a first drive 52 extending between the rear room wall 24 and the rear wall portion 34, and is operative for linearly moving the box 10 in either direction of double-headed linear arrow 58, as well as for circumferentially moving the box in either direction of double-headed curved arrow 60. A second drive 54 extends between the side room wall 26 and the box side wall 36, and is operative for linearly moving the box in either direction of double-headed linear arrow 66, as well as for circumferentially moving the box in either direction of double-headed curved arrow 68. A third drive 56 extends between the ceiling 18 and the box top wall portion 42, and is operative for linearly moving the box in either direction of double-headed linear arrow 62, as well as for circumferentially moving the box in either direction of double-headed curved arrow 64.

The three drives 52, 54, 56 are identical and, hence, for the sake of brevity, details of only the drive 52 are described. Each drive includes a universal ball joint 70 journaled in a socket 72 attached to a room wall. The joint 70 is mounted at one end of a shaft 74 on whose other end a bidirectional electrical motor 76 is mounted. Motor 76 has a rotary drive shaft 78 connected to a first clutch part 80. A second clutch part 82 separable from the first clutch part 80 is connected by a shaft 84 to a cylinder 86. Cylinder 86 bounds an interior in which a piston 88 is slidably mounted. An axially-splined piston rod 90 extends from the piston 88 out of the cylinder 86 to another universal ball joint 92. Joint 92 is journaled in a socket 94 attached to the box. Pressure lines 96, 98 communicate with the interior of the cylinder 86 on opposite sides of the piston 88.

When the clutch parts 80, 82 are engaged, electrical energization of the motor 76 causes the rotary drive shaft 78 and, in turn, the box 10, to turn about axis 44 due to the splined interengagement between the cylinder 86 and the splined piston rod 90. With the clutch parts 80, 82 disengaged, fluid pressure, such as a pressurized liquid admitted into one of the lines 96, 98, linearly moves the piston 88 and, in turn, the box 10. The same turning and linear movement just described in relation to drive 52 and the axis 44 is employed in the other drives 54, 56 to move the box relative to the axes 46, 48.

Inside the box, a horizon line 100 extends across the front wall portion 32 and, preferably, across the side wall portions 36, 38 and the rear wall portion 34 of the box. An artificial environment scene such as a cloud formation 102 is provided on the wall portions in full view of the pilot.

In addition, a lighting arrangement for emitting light is also provided on the wall portions of the box. The lighting arrangement includes a single light 104 and a single light 106 to simulate the sun and the moon, a series of scattered lights 108 to simulate the stars, ground lights, etc., and a linear series of lights 110 to simulate runway lights. Movement of the box 10 relative to the pilot 14 in one or more of the directions denoted by arrows 58, 60, 62, 64, 66, 68, while the pilot is staring at the horizon line 100, the cloud scene 102, or the lights 104, 106, 108, 110, effectively imparts a false illusion of position in the pilot's mind and, hence, simulates vertigo. By repeated simulations, a pilot can be trained to withstand the vertigo.

The trainer 16 generally includes a clear canopy above the pilot. This invention also proposes covering about one-half of the canopy with an opaque cover 112, while the other half of the canopy remains light-transmissive. This feature also contributes to inducing vertigo in the pilot.

In the preferred embodiment, the box 10 is free to rotate through a total angle of about 90° around axis 44 and axis 46. Complete rotation about axis 48 is possible. Movement along the axes 44, 46, 48 is limited by the spacing between the trainer and the box. Box 10 may also be provided with an access door to enable the pilot to enter the trainer 16. Preferably, the pilot enters the box through the open bottom. The drives 52, 54, 56 need not be mounted to room walls, but, instead, may be mounted to a stationary or movable frame.

Figure 3:
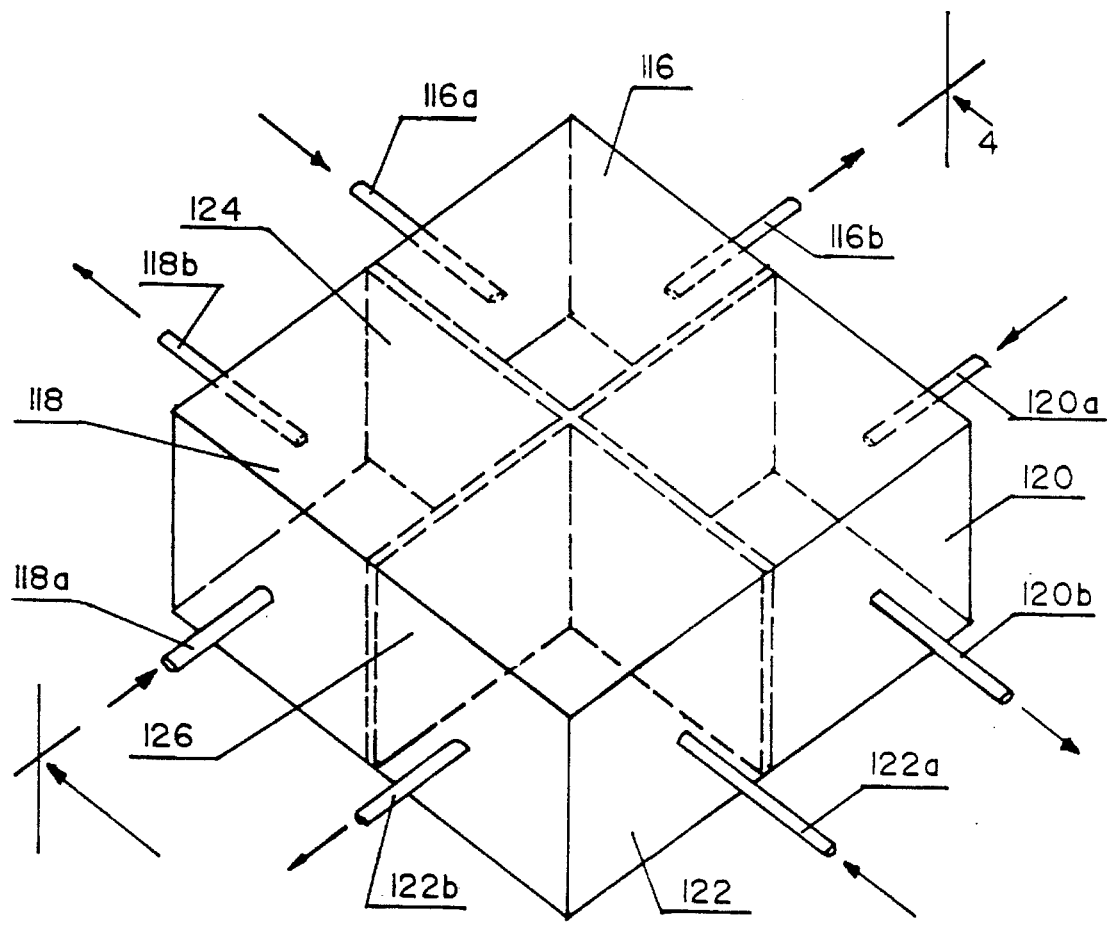
FIG. 3 is a diagrammatic view of a gravitational vertigo-simulating arrangement.
Figure 4:
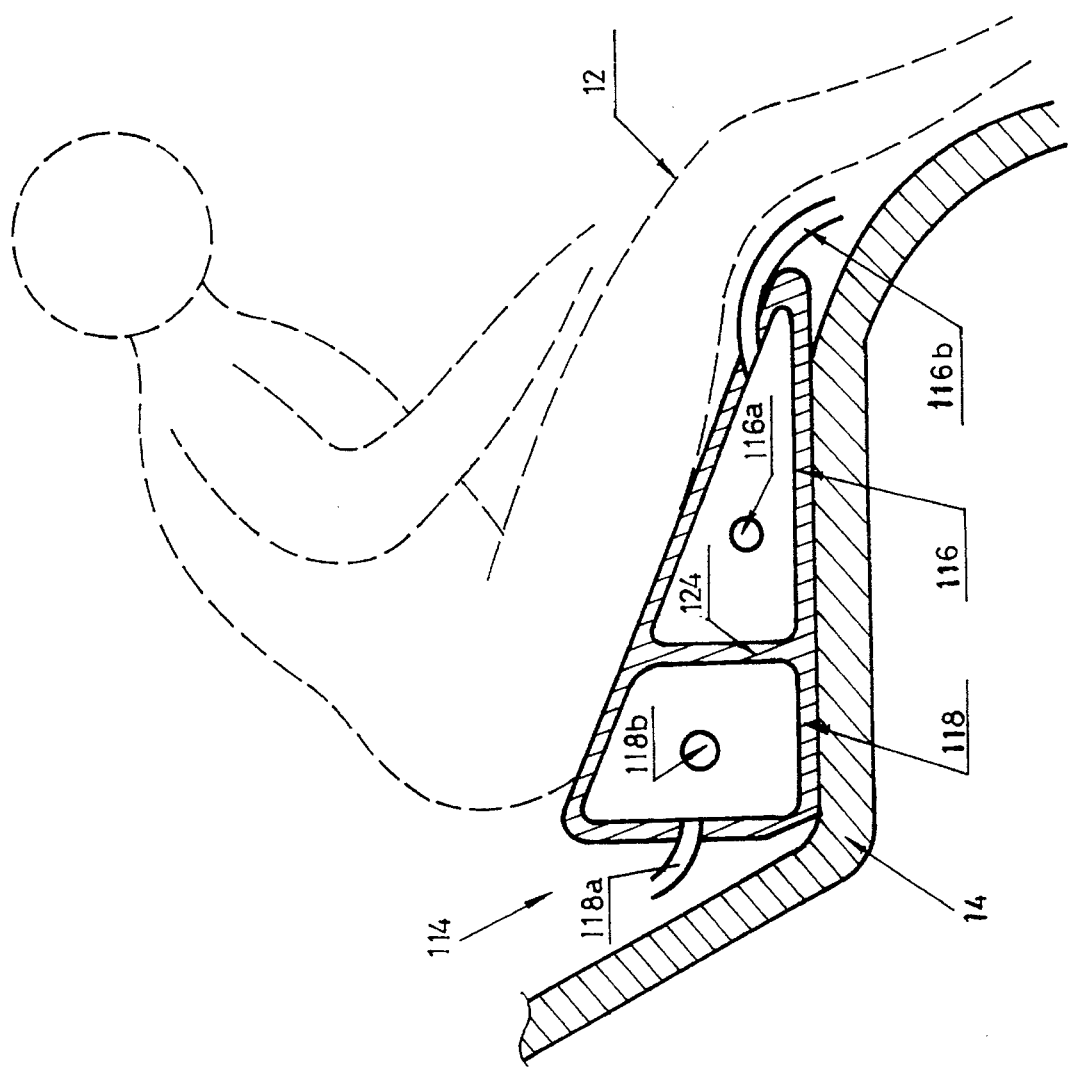
FIG. 4 is a sectional view taken on line 4—4 of FIG. 3.

Referring now to FIGS. 3 and 4, an inflatable cushion or pad 114 is positioned on the seat 14 under the pilot 12. Pad 114 includes multiple compartments 116, 118, 120, 122 separated by partitions 124, 126. Compartments 116, 118, 120, 122 have respective inlets 116a, 118a, 120a, 122a and respective outlets 116b, 118b, 120b, 122b. A pressurized fluid such as air is admitted via one or more inlets and/or exhausted via one or more outlets to vary the seated orientation of the seated pilot. As shown in FIG. 4, rear compartments 116, 118 are relatively fully inflated, while front compartments 120, 122 are partially deflated in order to pitch the pilot forward. By controlling the inflation to the various compartments, the pilot can be pitched forward or rearward through various angular distances, e.g. on the order of 30° relative to the vertical, or can be rolled to the left or right sides, again through various angular distances, e.g. on the order of 60° relative to the horizontal.

It will be understood that each of the elements described above, or two or more together, also may find a useful application in other types of constructions differing from the types described above.

While the invention has been illustrated and described as embodied in an arrangement for and method of simulating vertigo in on-ground training of pilots to overcome in-flight vertigo, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for simulating vertigo in on-ground training of pilots to overcome in-flight vertigo, comprising:

an opaque enclosure surrounding a pilot, said enclosure including front and rear wall portions spaced apart of each other along a first axis, a pair of side wall portions spaced apart of each other along a second axis generally perpendicular to the first axis, and a top wall portion above the front and rear and side wall portions along a third axis generally perpendicular to both the first and second axes;

a trainer means positioned in said enclosure, said trainer means having a seat on which the pilot is seated, a light-transmissive canopy above the pilot, and an opaque cover overlying part of the canopy, while the remaining part of the canopy remains light transmissive;

an artificial environment scene on said wall portions surrounding the trainer means and having a horizon line extending across the front, rear and side wall portions within the enclosure; and moving means for effecting relative movement between the horizon line of the enclosure and the pilot relative to at least one of the axes to impart a false illusion of position to the pilot; wherein said moving means being controlled by a controller according to a training procedure, said training procedure being randomly generated for controlling said movement of said enclosure by said controller.

2. The arrangement according to claim 1, wherein the moving means moves the enclosure along the first axis.

3. The arrangement according to claim 1, wherein the moving means moves the enclosure along the second axis.

4. The arrangement according to claim 1, wherein the moving means moves the enclosure along the third axis.

5. The arrangement according to claim 1, wherein the moving means moves the enclosure around the first axis.

6. The arrangement according to claim 1, wherein the moving means moves the enclosure around the second axis.

7. The arrangement according to claim 1, wherein the moving means moves the enclosure around the third axis.

8. The arrangement according to claim 1, wherein the artificial environment scene on the wall portions surrounding the pilot includes a cloud and ground formation.

9. The arrangement according to claim 1 further comprising lighting means on the wall portions for emitting light.

10. The arrangement according to claim 9, wherein the lighting means is a linear row of lights.

11. The arrangement according to claim 9, wherein the lighting means is a single light.

12. The arrangement according to claim 1, wherein said seat comprising an inflatable seat cushion on which the pilot is seated in a seated position, said cushion having multiple chambers, and means for admitting and discharging pressurized gas relative to the chambers to change the seat position of the pilot.

13. A method of simulating vertigo in on-ground training of pilots to overcome in-flight vertigo, comprising the steps of:

surrounding a pilot with an opaque enclosure, said enclosure having front and rear wall portions spaced apart of each other along a first axis, a pair of side wall portions spaced apart of each other along a second axis generally perpendicular to the first axis, and a top wall portion above the front and rear and side wall portions along a third axis generally perpendicular to both the first and second axes;

positioning a trainer means in said enclosure, said trainer means having a seat on which the pilot is seated, a light-transmissive canopy above the pilot, and an opaque cover overlying part of the canopy, while the remaining part of the canopy remains light transmissive;

providing an artificial environment scene on said wall portions surrounding the trainer means and having a horizon line extending across the front, rear and side wall portions within the enclosure; and providing effecting relative movement between the horizon line of the enclosure and the pilot relative to at least one of the axes to impart a false illusion of position to the pilot by a moving means; wherein said moving means being controlled by a controller according a training procedure, said training procedure being randomly generated for controlling said movement of said enclosure by said controller.

14. The method according to claim 13 further comprising the steps of illuminating and extinguishing lights provided in the enclosure.

15. The method according to claim 13 further comprising the steps of changing a seat orientation of the pilot.

16. The method according to claim 13, wherein said training procedure listing and scheduling a series of non-computerized programs.

17. The method according to claim 13, wherein said training procedure including 5–15 programs, each program includes several actions randomly arranged by the controller.

18. The method according to claim 16, further comprises the steps of providing lighting means on said wall portions for emitting light, and wherein each one of said non-computerized programs includes randomly arranged actions for moving said enclosure, the lighting means, covering said canopy, and changing the seated orientation of the pilot.

19. The method according to claim 18, wherein each of said actions stands for 5–30 seconds randomly then returning to its original position by said controller.

20. The method according to claim 18, wherein the interval between actions is 20–60 seconds randomly.

* * * * *